No. 800,539. PATENTED SEPT. 26, 1905.
M. H. BLANCHARD.
DRAFT EQUALIZER.
APPLICATION FILED MAY 15, 1905.
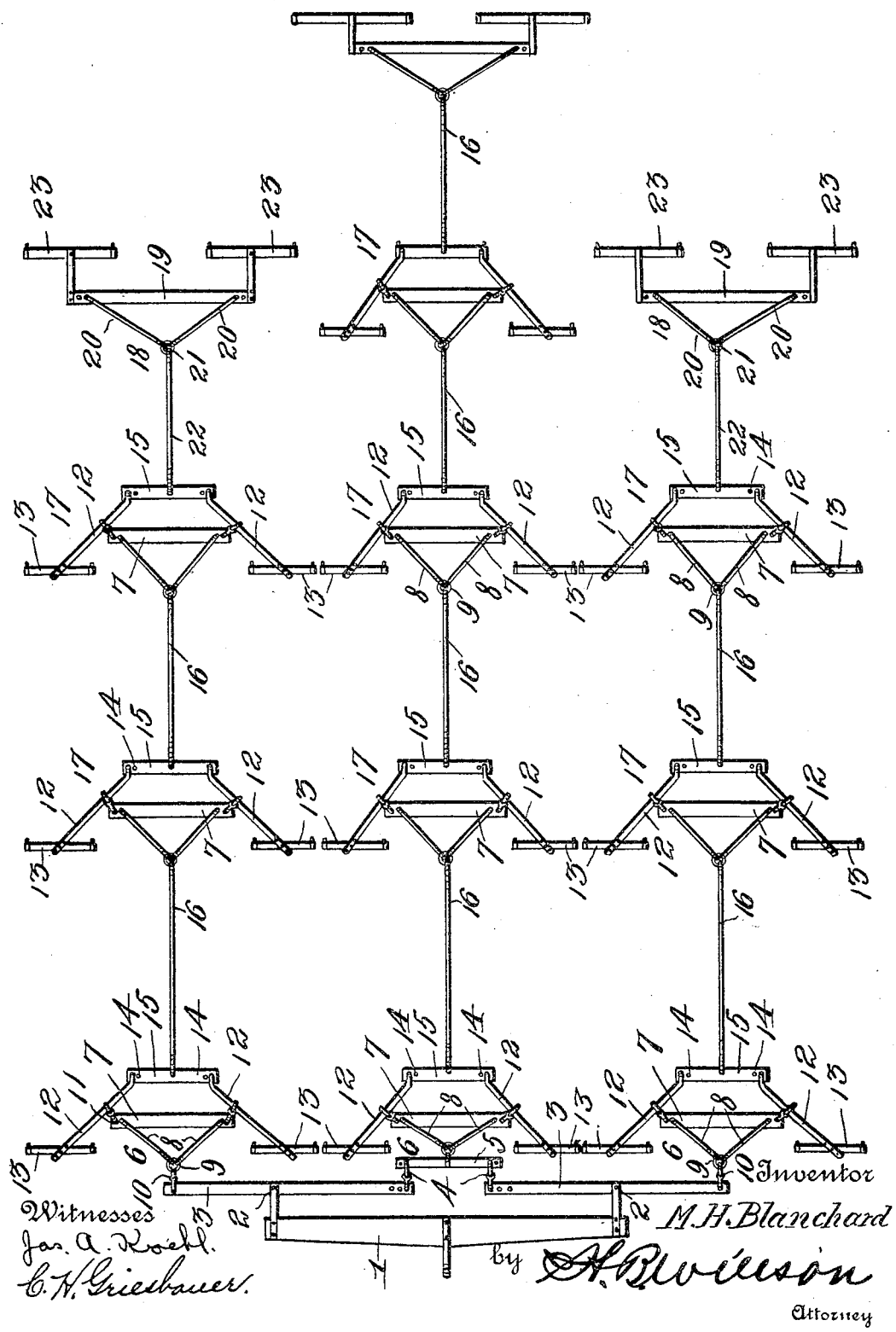

UNITED STATES PATENT OFFICE.

MARTIN H. BLANCHARD, OF DAVISVILLE, CALIFORNIA.

DRAFT-EQUALIZER.

No. 800,539. Specification of Letters Patent. Patented Sept. 26, 1905.

Application filed May 15, 1905. Serial No. 260,472.

*To all whom it may concern:*

Be it known that I, MARTIN H. BLANCHARD, a citizen of the United States, residing at Davisville, in the county of Yolo and State of California, have invented certain new and useful Improvements in Draft-Equalizers; and I do declare the following to be a full, clear, and exact description of the invention, such as will enable others skilled in the art to which it appertains to make and use the same.

My invention relates to improvements in draft-equalizers; and it consists in the construction, combination, and arrangement of devices herein shown and described.

The object of the invention is to provide a device of this character which will be of simple and inexpensive construction and very efficient in operation.

The above and other objects, which will appear as the nature of my invention is better understood, are accomplished by means of the construction illustrated in the accompanying drawing, in which the figure shows a plan view of a draft-equalizer constructed in accordance with my invention.

The embodiment of my invention shown in the drawing is adapted for connecting and equalizing the draft on twenty-six horses and comprises a main draft-beam 1, which is suitably connected at its center to the draft-tongue or pole of a harvester or other machine upon which the device is to be used. To the ends of the beam 1 are loosely connected, as shown at 2, equalizing-beams 3, the connections 2 being so disposed that the inner ends of the beams 3 are longer than their outer ends. Said inner ends are adjustably connected, by means of links 4, to the ends of an evener-bar 5. To the outer end of each of the evener-beams 3 and to the center of the evener-bar 5 is connected, as shown at 6, a spacing-bar 7. The connection 6 consists of two links 8, each having one of its ends connected to the outer end of the bar 7 and its other end connected to a ring 9, which is in turn connected by a link 10 to one of said evener-bars.

Adjustably connected, as at 11, to each of the ends of the spacing-bars 7 is an angularly-disposed evener-bar 12, which carries upon its rear or outer end an adjustable swingletree 13. The adjacent inner ends of each pair of the angularly-disposed evener-bars 12 are adjustably connected, as shown at 14, to the ends of a connecting-bar 15. Each of the connecting-bars 15 has pivotally connected to its center the rear end of a link 16, which has its front end connected to a group 17 of equalizing-bars, spacing-bars, and swingletrees, which is similar to the group composed of the parts 7, 15, 12, and 13. Any number of the groups 17 may be connected together, as clearly shown in the drawing, and to the foremost group is connected, as shown at 18, a doubletree 19. The connection 18 comprises two links 20, a ring 21, and a connecting-rod 22. Upon the outer ends of the doubletrees 19 are adjustably mounted swingletrees 23.

The construction, use, and advantages of the invention will be readily understood from the foregoing description, taken in connection with the accompanying drawing. It will be seen that the entire draft is centered by means of the beam 1 and that the eveners 3 equalize the draft as a whole on the three double rows of animals.

While I have shown in the drawing a draft device adapted for the use of twenty-six horses on a large harvesting-machine, it will be understood that the same may be adapted for use with any number of draft-animals.

Various changes in the form, proportion, and the minor details of construction may be resorted to without departing from the principle or sacrificing any of the advantages of this invention.

Having thus described my invention, what I claim as new, and desire to secure by Letters Patent, is—

A draft-equalizer comprising a main draft-beam, an evener-beam pivotally connected to each end of said main beam, an evener-bar having its ends loosely connected to the inner ends of said evener-beams, a spacing-bar connected by a pair of links to the outer ends of said evener-beams, a similar spacing-bar connected by a pair of links to the center of said evener-bar, angularly-disposed evener-bars loosely connected at their centers to the ends of said spacing-bars, swingletrees upon the outer ends of said angularly-disposed evener-bars, a connecting evener-bar having its ends loosely connected to the adjacent inner ends of each pair of angularly-disposed evener-bars, doubletrees, link-rods connecting said doubletrees with the centers of said connecting evener-bars, and swingletrees upon the outer ends of said doubletrees.

In testimony whereof I have hereunto set my hand in presence of two subscribing witnesses.

MARTIN H. BLANCHARD.

Witnesses:
H. P. EAKLE, Jr.,
GEORGE CLARK.